J. SCHAFFER.
COMBINED PROTECTIVE SHIELD AND ATTACHING DEVICE FOR RECEPTACLE COVERS.
APPLICATION FILED APR. 27, 1911.
1,038,001.
Patented Sept. 10, 1912.
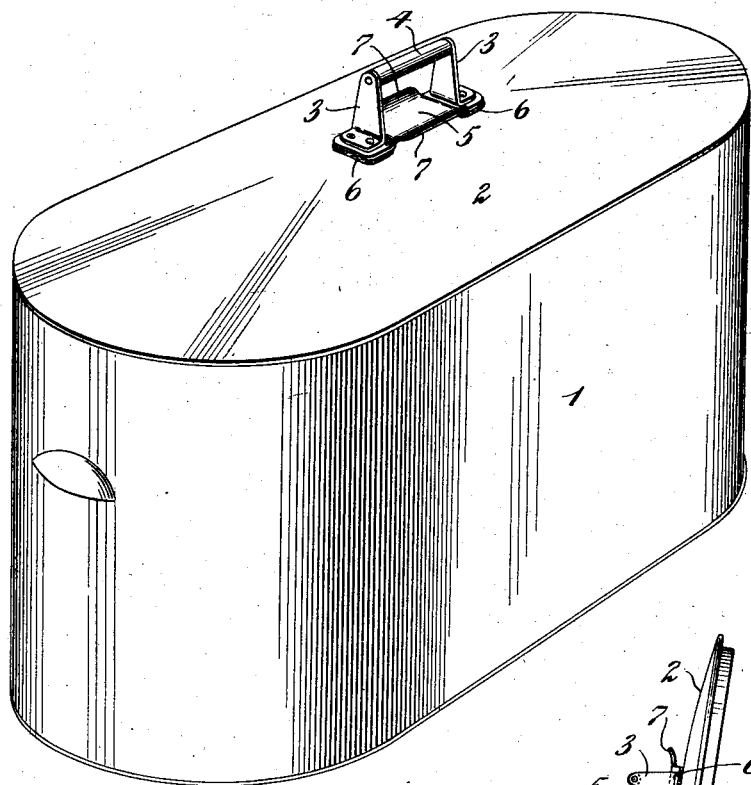
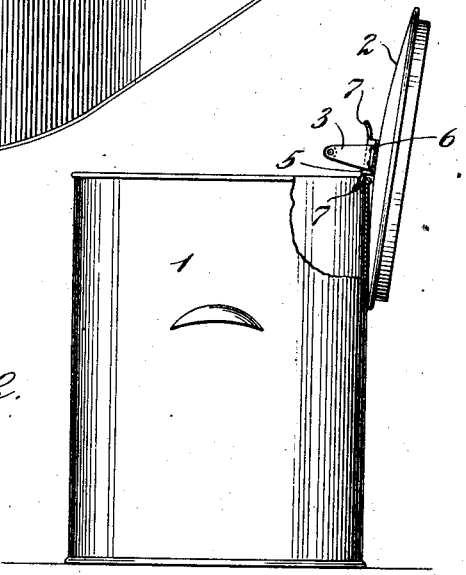

UNITED STATES PATENT OFFICE.

JACOB SCHAFFER, OF NEW YORK, N. Y.

COMBINED PROTECTIVE SHIELD AND ATTACHING DEVICE FOR RECEPTACLE-COVERS.

1,038,001.   Specification of Letters Patent.   Patented Sept. 10, 1912.

Application filed April 27, 1911.  Serial No. 623,625.

*To all whom it may concern:*

Be it known that I, JACOB SCHAFFER, a citizen of the United States, residing at the city of New York, in the borough of Brooklyn and State of New York, have invented certain new and useful Improvements in Combined Protective Shields and Attaching Devices for Receptacle-Covers, of which the following is a full, clear, and exact description.

My invention relates to a combined protective shield and attaching device for the cover handles of large cooking pots, boilers, washboilers, and the like, in which the handles are disposed at the central part of the cover.

In practice it often happens that the covers of such receptacles become so hot that the knuckles of the hand are badly burned when grasping the handle, and it is an object of my invention to provide a shield between the cover and handle which will protect the hand when grasping such a handle, such shield also providing means whereby the cover may be attached to the rim of the receptacle in its removed position.

In carrying out my invention I have devised a simple and cheap form of shield which is not alone adapted to perform the above recited functions, but is further adapted for other uses, in that it provides a suitable support for a fork, spoon, clothes-stick, or other implement; it affords fulcrum points for the knuckles whereby proper leverage may be obtained when removing the cover; and it further provides means for balancing the cover in the hand in its inverted position when the same is being itself used as a receptacle.

Referring to the accompanying drawings: Figure 1 is a perspective view of the top of a washboiler and its cover showing my novel shield disposed between the cover and its handle. Fig. 2 is a perspective view of a washboiler with the top of one side broken away and showing the cover hung upon the upper edge of the boiler by means of said combined shield and attaching device.

Referring to the drawings by numerals, the boiler has been designated 1 and has the usual cover 2, to the upper central part of which are attached up-rights 3 by means of rivets, or by other suitable means. These up-rights 3, together with a cross-bar 4 which is mounted between the upper extremities of the uprights in any suitable manner, constitute the handle. This cross-bar is preferably made of wood, fiber, or like non-heat-conducting material.

Between the handle and cover I locate my novel shield 5, which may be of metal or other suitable material and is preferably somewhat arch-shaped, so that it will be spaced from the cover throughout the greater part of its length, thereby allowing the air to freely circulate between the cover and shield. The clearance between the handle and shield is preferably just sufficient to permit the insertion of the fingers. The ends of the shield, which form the base of the arch, may extend under the uprights 3 and be secured to the cover by the same means which secures said uprights thereto. Between the cover and the ends of the shield suitable heat-insulating material 6 may be placed if desired. In this embodiment of my invention I have shown the shield 5 as provided with extensions 7, but it is obvious that many forms of shields may be employed whereby some or all of the advantages of my invention may be obtained. I prefer to bend these extensions upwardly in the manner shown, since when so bent they will readily engage the rim of the boiler for the purpose of hanging the cover thereon, and they further form fulcrum points for the knuckles whereby proper leverage may be obtained when removing the cover from the receptacle, and in addition provide means for balancing the inverted cover in the hand when using it as a receptacle, washboiler covers being often used in this manner, the operator removing the clothes from the boiler with one hand by means of a stick, and depositing them in the inverted cover which is held in the other hand. When used in this way, the upturned edge of one side of the shield bears upon the back of the fingers and the other edge of the shield bears upon the under side of the hand at the base of the thumb. These upturned edges furthermore provide a support for a stick, fork, spoon, or other implement.

As before pointed out my improved shield is adapted to perform a plurality of functions; *i. e.*, it protects the hand; provides a fulcrum for the knuckles; forms a support for a stick, or other implement; provides means for balancing the inverted cover in the hand; and it further affords convenient means whereby the cover may be hung on the rim of the receptacle.

I am aware that hooks for suspending boiler covers have been heretofore provided, but so far as I am aware no one has constructed a combined hook and protective shield for the purposes herein stated and most certainly has no one devised a combined hook and shield of one piece of material, comprehending all of the advantageous characteristics possessed by my device.

I do not wish to be limited to the particular construction herein shown and described, since I am aware that many changes may be made therein within the purview of my invention and hence I desire to be limited only by the scope of the appended claims.

Having described my invention, I claim:

1. In combination, a receptacle cover, a handle for said cover, a combined supporting hook and protective shield for said handle disposed between said handle and cover, portions of said shield being adapted for engagement with the edge of the receptacle whereby the cover may be suspended from said edge.

2. In combination, a receptacle cover, a handle for said cover, a combined supporting hook and protective shield for said handle disposed between said handle and cover, the body of said shield being spaced from said cover, portions of the shield being adapted for engagement with the edges of the receptacle whereby the cover may be suspended from said edge.

3. The combination with a receptacle cover, of an arch-shaped protective shield attached to said cover, said shield having upturned edges on the sides thereof adapted to partly encircle and to support an elongated implement and forming a supporting hook by which the cover may be hung upon the edge of the receptacle, and a handle attached to said shield.

In witness whereof, I subscribe my signature, in the presence of two witnesses.

JACOB SCHAFFER.

Witnesses:
 WALDO M. CHAPIN,
 WILLIAM C. LANG.

Copies of this patent may be obtained for five cents each, by addressing the "Commissioner of Patents, Washington, D. C."